June 22, 1937.  G. MAIURI  2,084,402
PRODUCTION OF SOLID CARBON DIOXIDE
Filed Dec. 3, 1934
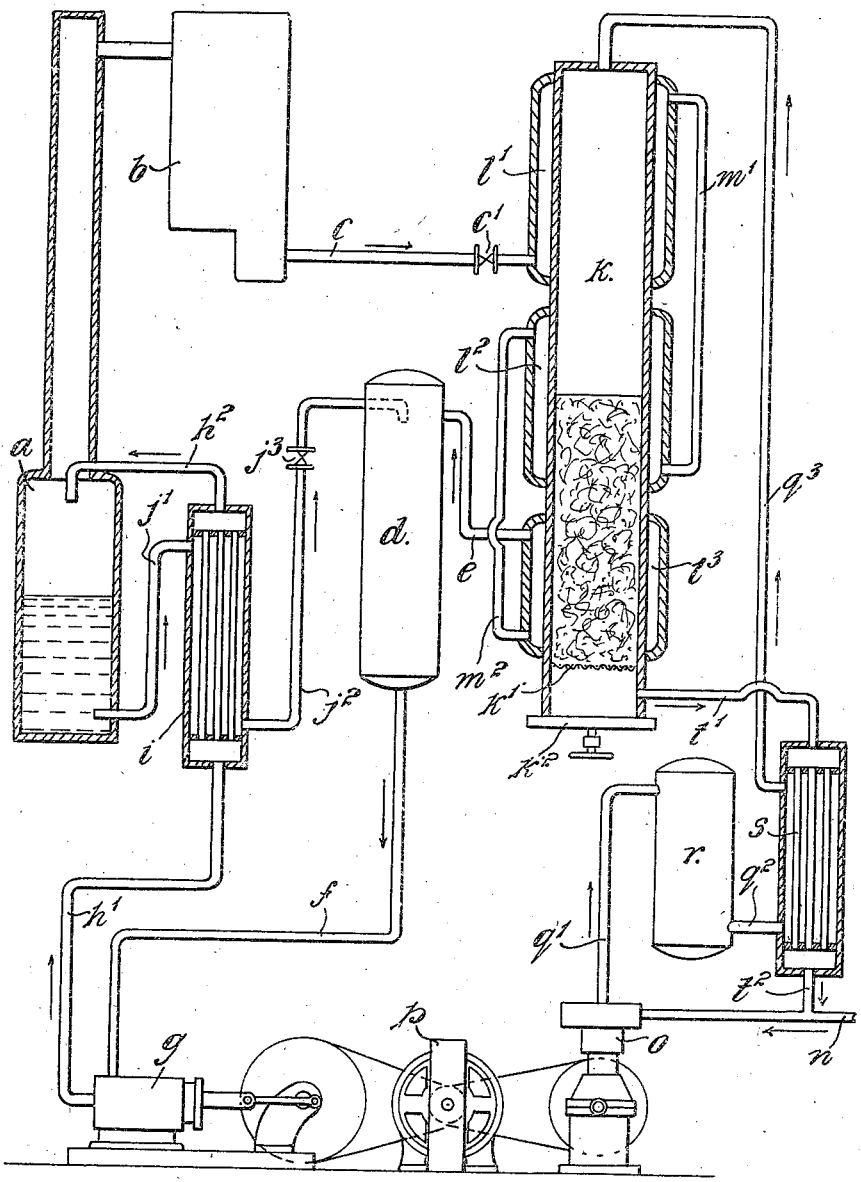
INVENTOR
GUIDO MAIURI
BY: Francis E. Boyce
ATTORNEY Patented June 22, 1937

2,084,402

UNITED STATES PATENT OFFICE 2,084,402

PRODUCTION OF SOLID CARBON DIOXIDE

Guido Maiuri, Aldwych, London, England, assignor to Maiuri Refrigeration Patents Limited, London, England Application December 3, 1934, Serial No. 755,754
In Great Britain June 6, 1934

2 Claims. (Cl. 62—121)

This invention relates to the production of solid carbon dioxide, and its object is to cause carbon dioxide to freeze into dense blocks.

It has already been proposed to produce dense blocks of solid carbon dioxide by forming carbon dioxide snow by the expansion in a chamber of liquid carbon dioxide, the snow being supported on a sieve beneath which carbon dioxide gas is drawn off to cause liquid carbon dioxide to permeate and render the snow dense.

According to the present invention, liquid carbon dioxide at low pressure is cooled to a solidifying temperature in a mould cooled by an evaporating refrigerating agent, whilst the liquid carbon dioxide is subjected to pressure conditions permitting evaporation therefrom. Thus the low pressure liquid carbon dioxide is subjected to the combined cooling effects of the evaporating refrigerating agent and of evaporating carbon dioxide.

An installation for carrying out the invention is illustrated on the accompanying drawing, which shows the installation in diagrammatic sectional elevation.

Referring to the drawing, $a$ is the boiler of an absorption refrigerating machine. $b$ is the condenser thereof, in which a refrigerant such as ammonia is liquefied and from which it is supplied by a pipe $c$, having an expansion valve $c^1$, to the evaporator, in the present instance jackets surrounding a mould as will be described later. $d$ is the absorber of the refrigerating machine to which the evaporated refrigerant passes by a pipe $e$. From the absorber $d$ enriched absorption liquor is withdrawn along a pipe $f$ by a pump $g$, which delivers it to the boiler $a$ by a pipe $h^1$, a heat-exchanger $i$, and a pipe $h^2$. Weak liquor is forced by the boiler pressure along a pipe $j^1$, the heat-exchanger $i$ and a pipe $j^2$ to the absorber $d$, past a pressure-reducing valve $j^3$.

$k$ is a mould surrounded by three superposed jackets $l^1$, $l^2$, $l^3$ constituting the evaporator of the refrigerating machine. Liquid refrigerant is supplied from the condenser $b$, by the pipe $c$ to the bottom of the uppermost jacket $l^1$. The top of the uppermost jacket $l^1$ is connected by a pipe $m^1$ to the bottom of the intermediate jacket $l^2$, and the top of the intermediate jacket $l^2$ is connected to the bottom of the lowermost jacket $l^3$ by a pipe $m^2$. The top of the lowermost jacket $l^3$ is connected to the absorber $d$ by the already-mentioned pipe $e$.

Carbon dioxide gas from any suitable source arrives by a pipe $n$, and is compressed by a single-stage compressor $o$ to a pressure slightly above the triple point pressure, for instance 7 atmospheres absolute.

The compressor $o$ is driven by an electro-motor $p$ which also drives the pump $g$.

The compressed carbon dioxide gas passes by a pipe $q^1$ to a cooler $r$ wherein it is cooled to atmospheric temperature. From the cooler $r$ the compressed carbon dioxide passes by a pipe $q^2$ to a heat-exchanger $s$, and thence by a pipe $q^3$ to the interior of the top of the mould $k$.

From the bottom of the mould $k$ and beneath a perforated false bottom or partition $k^1$ permeable to gas but not to liquid, a pipe $t^1$ leads to the heat-exchanger $s$ which is connected by a pipe $t^2$ to the gas supply pipe $n$ and consequently also to the suction of the compressor $o$.

The sub-atmospheric pressure in the absorber $d$ is arranged to be so low that the refrigerant in the jackets $l^1$, $l^2$, $l^3$ evaporates at temperatures such as to maintain the internal surface of the mould at temperatures which decrease downwards from slightly above the triple point temperature of carbon dioxide at the top to slightly below the triple point temperature of carbon dioxide at the bottom. These differences of temperatures in the jackets and mould are obtained by the liquid refrigerant in the upper jackets $l^1$ and $l^2$ evaporating against the static pressure head of the liquid refrigerant in the lower jacket $l^3$ or jackets $l^2$ and $l^3$ respectively.

Owing to the temperatures reigning in the mould $k$, the carbon dioxide gas compressed to slightly above its triple point pressure entering the mould $k$ by the pipe $q^3$ liquefies at and deposits itself as dew on the wall of the mould and flows down and solidifies on the perforated false bottom $k^1$ the apertures of which are covered with gauze impermeable, owing to surface tension, by liquid carbon dioxide although permeable to gaseous carbon dioxide. At the same time the suction exerted by the compressor $o$ on the space beneath the false bottom $k^1$ of the mould causes some of the carbon dioxide to evaporate and thereby exert an additional cooling effect on the remainder within the mould.

The reduced pressure beneath the false bottom $k^1$ not only will induce evaporation of some of the carbon dioxide and so assist in freezing the remainder, but will also draw liquid carbon dioxide into any interstices in the block of solid carbon dioxide to freeze therein, thus promoting continuity of the dense structure of the block. In the foregoing method of producing solid carbon dioxide, suction is continuously applied beneath the false bottom $k^1$ of the mould $k$, whereas in operating the apparatus described in my Patent No. 1,974,681, the bottom of the mould is opened to the suction of the compressor or to the atmosphere to vent the mould on starting the freezing and for testing.

The above described arrangement wherein the carbon dioxide is introduced at low pressure in the gaseous form into the mould $k$ is more particularly suited for small installations.

The block of carbon dioxide ice is removed from the mould $k$ on removing a bottom cover $k^2$ and the false bottom $k^1$.

I claim:

1. A method of producing dense solid carbon dioxide in a mould, consisting in cooling the upper portion of said mould to a temperature slightly above and the lower portion of said mould to a temperature below the triple point temperature of carbon dioxide, and continuously admitting gaseous carbon dioxide at slightly above the triple point pressure of carbon dioxide into said mould while applying suction to the under surface of solid carbon dioxide formed in said mould.

2. A method of producing dense solid carbon dioxide in a mould, consisting in cooling said mould by evaporating a liquid refrigerant under a plurality of slightly different pressures causing the temperatures of said mould to decrease downwards from slightly above to below the triple point temperature of carbon dioxide, and continuously admitting gaseous carbon dioxide at slightly above the triple point pressure of carbon dioxide into said mould while applying suction to the under surface of solid carbon dioxide formed in said mould.

GUIDO MAIURI.